United States Patent [19]

Muraishi et al.

[11] Patent Number: 4,619,725
[45] Date of Patent: Oct. 28, 1986

[54] METHOD OF PRODUCING A HEADREST

[75] Inventors: Masakazu Muraishi, Isehara; Kazumi Hira, Fujisawa, both of Japan

[73] Assignee: Nissan Motor Co., Ltd., Yokohama, Japan

[21] Appl. No.: 773,539

[22] Filed: Sep. 9, 1985

[30] Foreign Application Priority Data

Sep. 10, 1984 [JP] Japan .................................. 59-190109

[51] Int. Cl.4 ............................................. B32B 31/04
[52] U.S. Cl. .................................... 156/182; 156/213; 156/214; 156/228; 297/391
[58] Field of Search ............... 156/182, 212, 213, 214, 156/228, 322; 297/391, 396

[56] References Cited

U.S. PATENT DOCUMENTS

| | | | |
|---|---|---|---|
| 3,146,143 | 8/1964 | Bolesky et al. | 156/212 |
| 3,423,267 | 1/1969 | Munk | 156/214 Y |
| 4,323,410 | 4/1982 | Urai | 156/228 |
| 4,337,116 | 6/1982 | Foster et al. | 156/212 |
| 4,416,716 | 11/1983 | Ichikawa et al. | 156/212 |

FOREIGN PATENT DOCUMENTS 58-34653 3/1983 Japan .
58-203714 11/1983 Japan .

Primary Examiner—Michael Ball
Attorney, Agent, or Firm—Leydig, Voit & Mayer

[57] ABSTRACT

Herein disclosed is a method of producing a headrest comprising preparing a lower mold formed with a rectangular gutter-like cavity leaving a central land, extending a thermoplastic film over the shaped work face of the lower mold, and softening the plastic film by heating it. The method further includes placing an upper mold with a counter-shaped face onto the work face of the lower mold to provide a molded article of the thermoplastic film, applying the inner surface of the molded article with adhesive, putting a pad of shock-absorbing material into the molded article, and pressing the pad against the molded article to assure bonding therebetween. The method further comprises cutting the molded article at the portions other than the portions which substantially cover the pad, thereby to provide freely movable fragments of the film, and folding back the fragments of the film to cover the remaining portions of the pad, thereby to provide one pad unit. In addition, the method comprises preparing another pad unit by carrying out the preceding steps, putting the two pad units together in face-to-face relationship with a cored member installed between them, and thrusting welts between the mutually facing faces of the assembled first and second pads.

5 Claims, 15 Drawing Figures

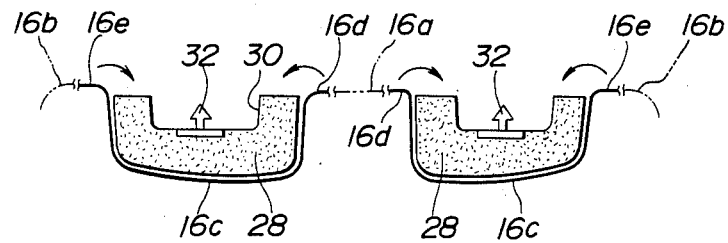
FIG. 7
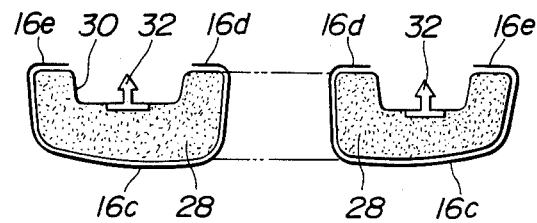
FIG. 8
FIG. 10
FIG. 9
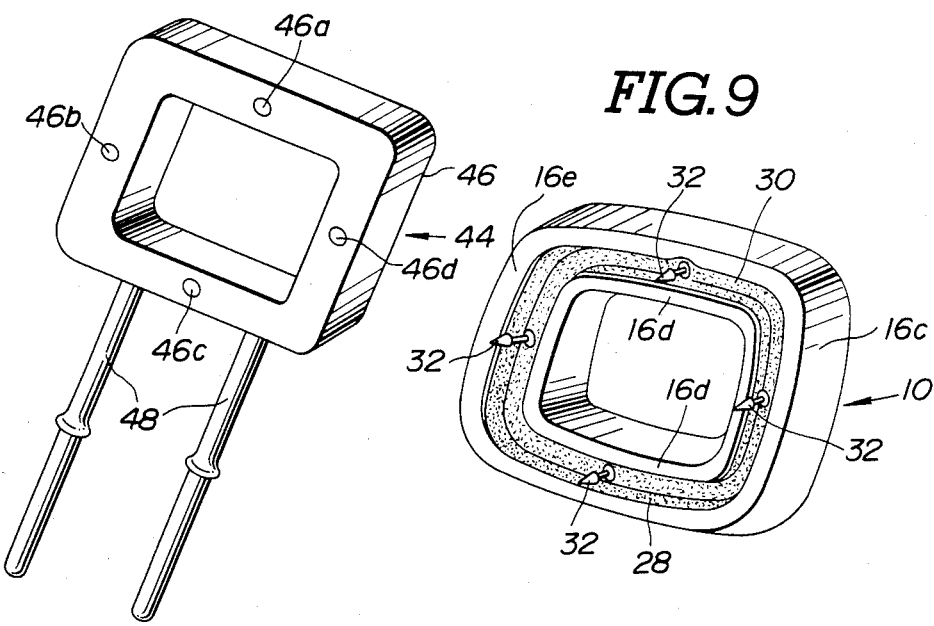

METHOD OF PRODUCING A HEADREST

BACKGROUND OF THE INVENTION

1. Field of the Invention

The present invention relates to a method for producing a headrest for a vehicular seat, and more particularly to a method for producing a headrest of a type having a central aperture formed therethrough and a method of producing the same.

2. Description of the Prior Art

Hitherto, various kinds of vehicular headrests have been proposed and put into practical use for pretecting the heads of seat occupants upon vehicle collision. Some of them are of a type having a central aperture formed therethrough, and usually, the headrest comprises a stay member, a pad mounted to the stay member and an outer skin member covering the pad. However, when the headrest is of the type having the central aperture, covering the pad with the outer skin requires troublesome work steps due to the complicated configuration of such headrest. Thus, in some cases, the outer skin tends to produce thereon unsightly creases upon assembly of the headrest, deteriorating the external appearance of the product. This undesirable phenomenon becomes much more severe when a woven fabric is used as the outer skin.

SUMMARY OF THE INVENTION

It is therefore an object of the present invention to provide a method of producing an improved headrest which is free of the unsightly creases of the skin member.

According to the present invention, there is provided a method of producing a headrest, which comprises in steps: preparing a lower mold formed with a rectangular gutter-like cavity leaving at the central portion a central land, expanding a thermoplastic film over the shaped face of the lower mold, heating the thermoplastic film to soften the same, placing an upper mold with a counter-shaped fact onto the shaped face of the lower mold to provide a molded article of the thermoplastic film, applying the inner surface of the molded article with adhesive, putting a pad of shock absorbing material into the molded article, pressing the pad against the molded article to assure bonding therebetween, cutting the molded article at the portions other than the portions substantially covering the pad thereby to provide freely movable flagments of the film, folding back the fragments of the film to cover remained naked portions of the pad thereby to provide one pad unit, preparing another pad unit by carrying out the same producing steps, putting the two pad units together in face-to-face relationship with a core member installed therebetween, and thrusting welts between the mutually facing faces of the assembled first and second pads.

BRIEF DESCRIPTION OF THE DRAWINGS

Other objects and advantages of the present invention will become apparent from the following description when taken in conjunction with the accompanying drawings, in which:

FIGS. 1 to 8 are illustrations showing the steps of producing a pad unit used as a part of the headrest of a first embodiment of the present invention;

FIG. 9 is a perspective view of the pad unit;

FIG. 10 is a stay unit used also as a part of the headrest of the invention;

DETAILED DESCRIPTION OF THE INVENTION

Referring to FIGS. 1 to 9, there are shown the steps of producing a pad unit 10 (see FIG. 9) used as a part of the headrest of the invention. As will become apparent as the description proceeds, the headrest of the invention is constructed to use two pad units of the same construction.

Figure 1:
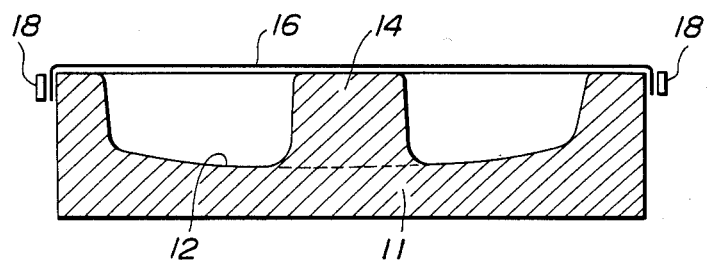

As is seen in FIG. 1, a lower mold 11 is formed with a rectangular gutter-like cavity 12 leaving at the cenral portion a center land 14. That is, the cavity 12 is constructed to surround the center land 14. A thermoplastic film 16, such as polyvinyl chloride film, is extended over the lower mold 11 having the peripheral portions fixed to the mold 11 by means of clamping devices 18. The film 16 serves as an outer skin of the headrest proper as will become clear hereinafter.

Figure 2:
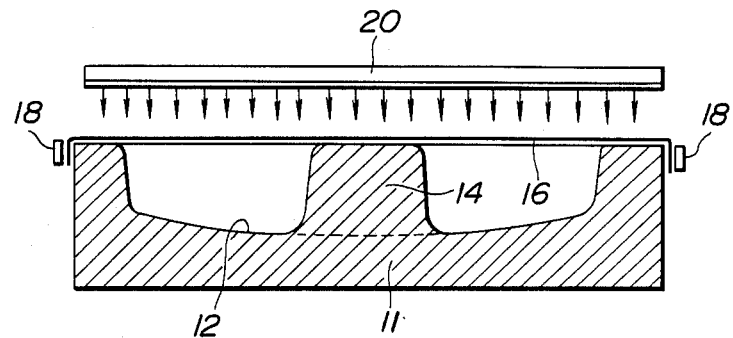
Figure 3:
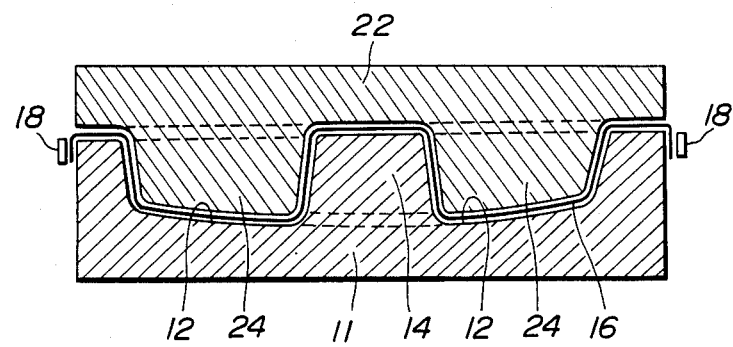
Figure 4:
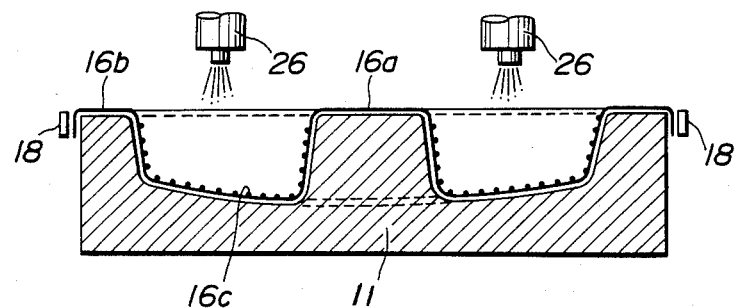
Figure 5:
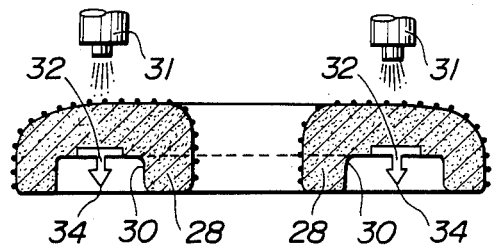

Then, as is shown in FIG. 2, a heater 20 is placed adjacent the film 16 to soften the same, and then, as is seen from FIG. 3, an upper mold 22 with a counter-shaped work face is placed onto the lower mold 11 having the rectangular ridge portion 24 thereof pressed against the rectangular cavity 12 of the lower mold 11. After awhile, that is, after sufficient curing is effected in the film 16, the upper mold 22 is removed from the lower mold 11. With this, the thermoplastic film 16 is molded to have a configuration of generally W-shaped cross section, that is, as is seen from FIG. 4, the configuration which comprises a raised central portion 16a, a raised rim portion 16b and a rectangular gutter-like portion 16c.

Then, a suitable adhesive is applied to the inner surface of the molded film 16 by means of spray guns 26.

During the above-mentioned work, a pad 28 having a configuration which matches with the interior shape of the molded film 16 is prepared. Foamed polyurethane may be used as the material of the pad 28. As is seen from FIG. 5, the pad 28 is formed at its inboard side with a rectangular gutter-like groove 30, and four connecting pins 32 are fixed to the bottom of the groove 30 at evenly spaced intervals as may be understood from FIG. 9. Each pin 32 is formed with an enlarged conical head portion 34.

Figure 6:
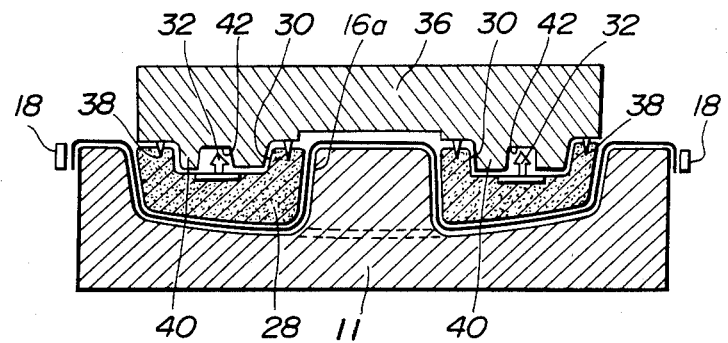

The outer surface of the pad 28 is applied with an adhesive by means of spray guns 30, and then, as is seen from FIG. 6, the adhesive-coated pad 28 is put in the afore-mentioned molded film 16. Then, a press die 36 is placed on the pad 28 to achieve assured bonding between the molded film 16 and the pad 28. As is seen from the drawing, the press die 36 is provided with a number of pins 38 which stick in the pad 28 to assure positioning of the pad 28 relative to the lower mold 11. In order to avoid interference with the connecting pins 32 on the pad 28, the press die 36 is formed at its projected work face 40 with a rectangular gutter-like groove 42.

When sufficient bonding between the two parts is achieved, the press die 36 and the skin-bonded pad 28 are removed from the lower mold 11.

Then, as is seen from FIG. 7, the raised central portion 16a of the molded film 16 is cut to provide four substantially trapezoidal fragments 16d, and the raised rim portion 16b of the film 16 is cut to provide four trimmed rim portions 16e. The trapezoidal fragments 16d and the trimmed rim portions 16e are folded back to cover the naked portions of the pad 28, as is understood from FIGS. 7 and 8. With this procedure, a pad unit 10 as shown in FIG. 9 is produced. If desired, the folded back portions 16d and 16e may be bonded to the pad 28.

Then, a stay unit 44 as shown in FIG. 10 is prepared. The stay unit 44 comprises a rectangular core member 46 and two rods 48 which extend parallelly from the core member 46. The rectangular core member 46 is sized to be snugly received in the rectangular gutter-like groove 30 of the pad unit 10. The front and rear sides of the core member 46 are each formed with four openings 46a, 46b, 46c and 46d which are located to mate with the four connecting pins 32 on the pad unit 10.

The pad unit 10 is mounted on one side of the core member 46 of the stay unit 44 having the groove 30 thereof receive therein the same. During this, the connecting pins 32, viz., the enlarged conical head portions 34 of the same are slipped into the corresponding openings 46a, 46b, 46c and 46d of the core membern 46 to assure tight and locking connection of the pad unit 10 to the core member 46. Then, another pad unit 10 having the same construction as that just mentioned is mounted to the other side of the core member 46 in substantially the same manner as that just mentioned. With this, the two pad units 10 are assembled with each other in face-to-face relationship with the core member 46 of the stay unit 44 installed therebetween.

Figure 11:
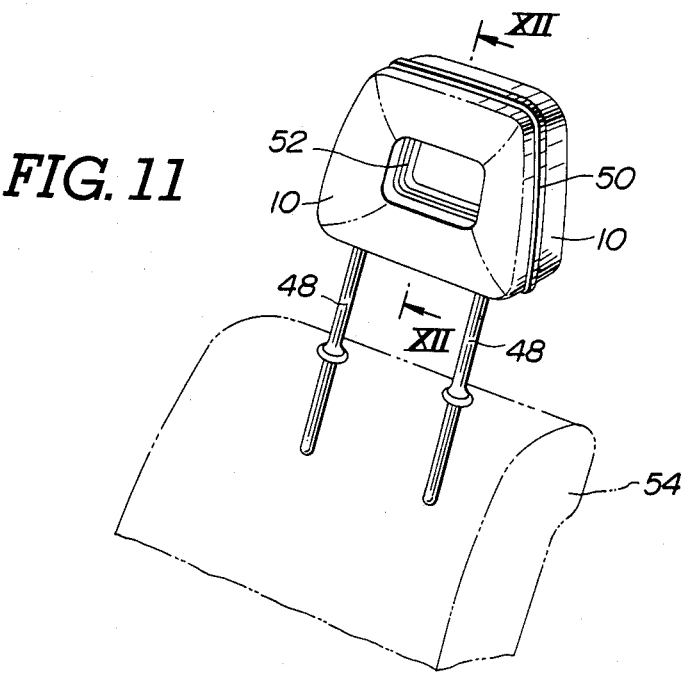
FIG. 11 is a perspective view of the headrest in assembled condition.
Figure 12:
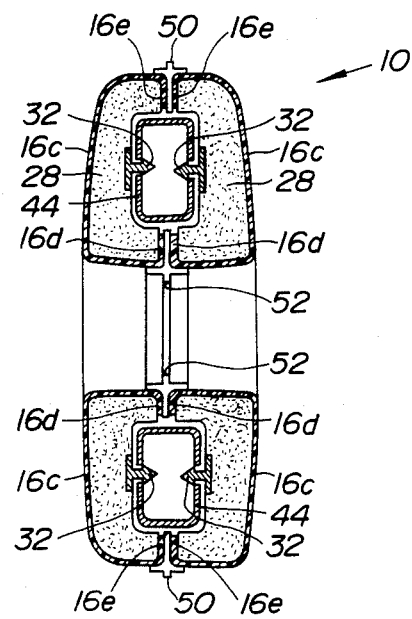
FIG. 12 is a sectional view taken along the line line XII—XII of FIG. 11.

Then, as may be understood from FIGS. 11 and 12, outer and inner welts 50 and 52, each having a generally T-shaped cross section, are thrusted at the ridge portions between the mutually facing faces of the two pad units 10 at the positions outside and inside of the core member 46. With the provision of the welts 50 and 52, the folded back portions 16e and 16d are prevented from not only getting out of place but also from producing unsightly creases of the film 16. As is seen from FIG. 11, the assembled headrest is mounted on the top of a seatback 54 having the rods 48 lockably received in holes (no numerals) defined in the seatback 54.

Figure 13:
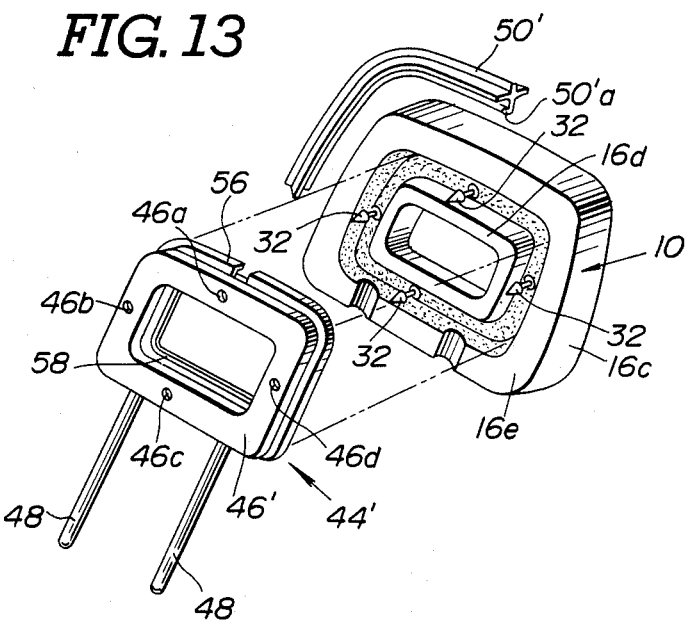
FIG. 13 is an exploded perspective view of a headrest of a second embodiment of the present invention.
Figure 14:
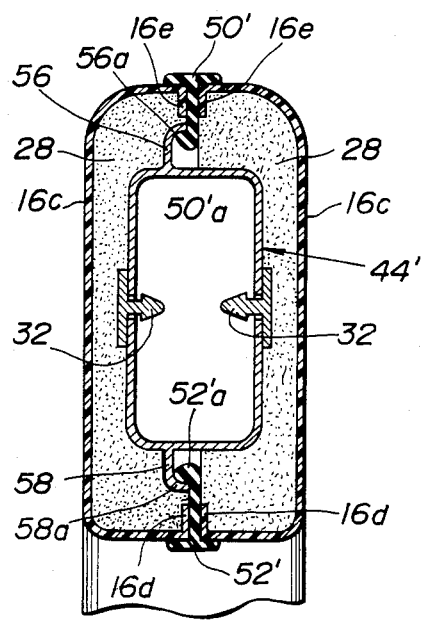
FIG. 14 is a partial sectional view of the headrest of the second embodiment in assembled condition.

Referring to FIGS. 13 and 14, there is shown a second embodiment of the present invention, which is substantially the same as the first embodiment except for a few points. That is, in this second embodiment, a measure is employed for lockingly fixing the welts 50' and 52' to the core member 46' of the stay unit 44'. For this purpose, the core member 46' is integrally formed about the outer and inner peripheral sides with outer and inner rims 56 and 58, each having a bent end 56a or 58a. In addition to this, the ridge portion of each welt 50' or 52' has a bent end 50'a or 52'a. Upon insertion of the ridge portions of the welts 50' and 52' between the two pad units 10, the bent ends 50'a and 52'a are brought into locking engagement with the bent ends 56a and 58a of the outer and inner rims 56 and 58 of the core member 44', respectively.

Figure 15:
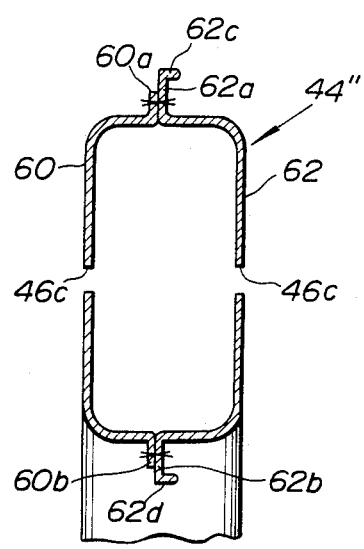
FIG. 15 is a partial view of a core member which is usable in the headrest of the second embodiment.

Referring to FIG. 15, there is shown a modified core member 44" which is usable as a substitute for the core member 44' of the second embodiment. The modified core member 44" comprises a first rectangular gutter-like member 60 and a second rectangular gutter-like member 62 which are secured or welded to each other at their flanges 60a, 60b, 62a and 62b in a manner to form a rectangular doughnut-shaped box. The widths of the outer and inner flanges 62a and 62b of the second rectangular gutter member 62 are greater than those of the corresponding flanges 60a and 60b of the first rectangular gutter-like member 60, and the flanges 62a and 62b have bent ends 62c and 62d respectively. Upon assembly, the flange bent portions 62c and 62d of the core member 46" are brought into locking engagement with the bent ends 50'a and 52'a of the welts 50' and 52' in substantially the same manner as that mentioned in the second embodiment of FIGS. 13 and 14.

What is claimed is:

1. A method of producing a headrest, comprising in steps:
   (a) preparing a lower mold formed with a rectangular gutter-like cavity leaving at the central portion a central land;
   (b) extending a thermoplastic film over the shaped work face of the lower mold;
   (c) heating said thermoplastic film to soften the same;
   (d) placing an upper mold with a counter-shaped face onto the work face of said lower mold to provide a molded article of the thermoplastic film;
   (e) applying the inner surface of the molded article with adhesive;
   (f) putting a pad of shock absorbing material into said molded article;
   (g) pressing said pad against said molded article to assure bonding therebetween;
   (h) cutting the molded article at the portions other than the portions which substantially cover the pad thereby to provide freely movable fragments of the film;
   (i) folding back the fragments of the film to cover the remained naked portions of said pad thereby to provide one pad unit;
   (j) preparing another pad unit by carrying out the same producing steps;
   (k) putting the two pad units together in face-to-face relationship with a core member installed therebetween; and
   (l) thrusting welts between the mutually facing faces of the assembled first and second pads.

2. A method as claimed in claim 1, in which, after said step (b), there is further employed a step of fixing the periphery of said thermoplastic film to said lower mold.

3. A method as claimed in claim 2, in which before the step (f) there is further employed a step of applying the outer surface of said pad with adhesive.

4. A method as claimed in claim 3, in which said step (g) further includes a step of positioning said pad relative to said molded article.

5. A method as claimed in claim 4, in which said step (l) further includes a step of lockingly engaging said welts with said core member.

* * * * *